US009635971B2

(12) United States Patent
Laithier et al.

(10) Patent No.: US 9,635,971 B2
(45) Date of Patent: May 2, 2017

(54) SYSTEM OF A CONTAINER FOR STORING AND DISPENSING A PRODUCT AND A MACHINE FOR DOSING THE PRODUCT

(75) Inventors: Karine Laithier, Peseux (CH); Alain Contal, La Sarraz (CH); Thierry Jean Robert Fabozzi, Geneva (CH); Zenon Ioannis Mandralis, Le Mont sur Lausanne (CH); Lucio Scorrano, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 981 days.

(21) Appl. No.: 13/997,025

(22) PCT Filed: Dec. 20, 2011

(86) PCT No.: PCT/EP2011/073430
§ 371 (c)(1),
(2), (4) Date: Jun. 21, 2013

(87) PCT Pub. No.: WO2012/084964
PCT Pub. Date: Jun. 28, 2012

(65) Prior Publication Data
US 2013/0291738 A1 Nov. 7, 2013

(30) Foreign Application Priority Data
Dec. 22, 2010 (EP) .................................. 10196371

(51) Int. Cl.
*A47J 31/40* (2006.01)
*G01F 1/00* (2006.01)
*A47J 42/50* (2006.01)
*G01F 11/00* (2006.01)
*G01F 11/24* (2006.01)

(52) U.S. Cl.
CPC ............. *A47J 31/404* (2013.01); *A47J 42/50* (2013.01); *G01F 11/003* (2013.01); *G01F 11/24* (2013.01)

(58) Field of Classification Search
CPC ....... A47J 31/404; A47J 42/50; G01F 11/003; G01F 11/24
USPC ........................ 99/289 R; 222/333, 342, 344
See application file for complete search history.

(56) References Cited

U.S. PATENT DOCUMENTS

| 1,966,326 A | 7/1934 | Wentorf |
| 2,584,781 A | 2/1952 | Beatty |
| 2,805,799 A | 9/1957 | Hileman |
| 3,129,853 A | 4/1964 | Hoskins |

(Continued)

FOREIGN PATENT DOCUMENTS

| AU | 2009202515 | 1/2010 |
| EP | 2070453 | 6/2009 |

(Continued)

*Primary Examiner* — Omar Flores Sanchez
(74) *Attorney, Agent, or Firm* — K&L Gates LLP

(57) ABSTRACT

The invention concerns a container (1) for storing and dispensing a flowable product comprising a tank (2) and a dispensing closure for dispensing the product from the tank comprising disc member (3, 4) with apertures (31, 41) therein, one of the disc (4) being rotatable and susceptible to cooperate with a rotatable shaft. The invention also concerns a machine susceptible to be fed with a flowable product stored in such a container, said machine comprising disc members (8, 9) with apertures (81, 91) therein, one of the disc (9) being rotatable and cooperating with a rotatable shaft (11).

18 Claims, 6 Drawing Sheets

(56) References Cited

U.S. PATENT DOCUMENTS

| | | | |
|---|---|---|---|
| 3,249,266 A | | 5/1966 | Cole et al. |
| 4,032,050 A | | 6/1977 | Funk |
| 5,123,574 A | | 6/1992 | Poulos |
| 5,651,506 A | * | 7/1997 | Hockey .................. A47G 19/24 222/142.1 |
| 5,934,516 A | * | 8/1999 | Strycharske ............. A23G 3/28 222/158 |
| 6,962,274 B1 | | 11/2005 | Sherman |
| 9,107,537 B2 | | 8/2015 | Bernhardsgruetter et al. |
| 2010/0308141 A1 | * | 12/2010 | Bich ....................... A47J 42/50 241/30 |
| 2014/0203050 A1 | * | 7/2014 | Blackburn ............ G01F 11/261 222/426 |
| 2015/0144719 A1 | * | 5/2015 | Wilson .................... A47J 42/14 241/85 |
| 2016/0069722 A1 | * | 3/2016 | Singh ..................... G01F 11/10 222/1 |

FOREIGN PATENT DOCUMENTS

| | | |
|---|---|---|
| JP | 5017000 | 2/1975 |
| JP | 2007084107 | 4/2007 |
| JP | 2007187260 | 7/2007 |
| WO | 9723155 | 7/1997 |
| WO | 2006133699 | 12/2006 |
| WO | 2007120133 | 10/2007 |
| WO | 2009144239 | 12/2009 |
| WO | 2010064912 | 6/2010 |

\* cited by examiner

SYSTEM OF A CONTAINER FOR STORING AND DISPENSING A PRODUCT AND A MACHINE FOR DOSING THE PRODUCT

CROSS REFERENCE TO RELATED APPLICATIONS

The present application is a National Stage of International Application No. PCT/EP2011/073430, filed on Dec. 20, 2011, which claims priority to European Patent Application No. 10196371.8, filed Dec. 22, 2010, the entire contents of which are being incorporated herein by reference.

FIELD OF THE INVENTION

The present invention relates to a system comprising a machine for metering and discharging accurately measured amounts of a flowable product and a container for storing said flowable product, particularly for the preparation of beverages by dilution of metered doses of food soluble ingredients.

BACKGROUND OF THE INVENTION

WO 2009/144239 describes a device for metering and discharging accurately measured amounts of powder material from a container storing the powder material, particularly for the preparation of beverages. The device comprises:
a fixed body comprising at least a disc presenting a single pierced aperture,
a rotary top disc disposed on the top of the fixed body and presenting a taking out pierced aperture,
a rotary bottom disc disposed on the bottom of the fixed body and presenting a discharging pierced aperture,
a rotary shaft connecting the bottom disc and the top disc,
wherein in the stand-by position of the device the metered pierced aperture is empty and closed to the atmosphere.

The top side of the metering and discharging device cooperates with a storing powder container and the bottom side cooperates with a mixing chamber so that a beverage can be prepared from the metered dose of powder and a dose of diluent. The storing powder container can be a simple container attached to the top side of the metering and discharging device. This container can also present specific functions like the container illustrated in WO 2009/000836 which avoids a refilling with non desirable powders. This container is adapted to work with a machine comprising a dosing unit such as described in WO 2009/144239.

One problem of such metering and discharging devices is that they are usually attached to one container containing a specific powder and that the powder inside the container cannot be changed before the container is totally empty because the container is a part of the machine. Consequently when the device is the metering and discharging powder device of a machine preparing beverages, only one type of beverage can be produced in the period during which the container is filled and until it is emptied. Then there is a need for a system of a metering and discharging powder device and a compatible container in which the container can be detached from the metering and discharging powder device even if it is not empty. It would enable the production of different beverages from the same machine even if the container is not empty: the consumer would have the possibility to change the container cooperating with the metering and discharging powder device depending on the nature of the beverage he would like to produce.

The present invention aims at solving the above problem.

SUMMARY OF THE INVENTION

According to a first aspect, the invention concerns a container for storing and dispensing a flowable product comprising:
a tank,
a dispensing closure for dispensing the product from the tank comprising:
an inner rotatable disc member having at least one aperture therein, said member facing the inside of the container,
an outer fixed disc member having at least one aperture therein, said member facing the outside of the container,
wherein:
the inner rotatable disc member presents means configured for cooperating with a rotatable shaft, and
the container presents means for positioning the container in a machine.

The container of the present invention can store a flowable product like a powder, free flowing particles but also pellets, granulates, granules or grains. The container stores in a closed manner in order to store, transport and sell this flowable product. In addition to storing such a flowable product the container allows easy unloading of the flowable product from the container by a machine designed to be fed by the flowable product.

The container of the present invention comprises mainly a tank; its function is to receive and store the flowable product. Any shape of tank could be used. The section of the tank can be circular, oval, square, or the like. The form and the size of the section can vary along the length of the tank to provide a better handling of the container or for providing a marketing appeal. In a preferred embodiment of the present invention the tank is a cylinder presenting a round section—even more preferably a decreasing round section—or an oval section; these forms enable easy manufacturing, easy storing and easy handling. The tank can be made of at least a material chosen between: plastic, cardboard paper, aluminium or a combination and/or laminate of such materials. These materials should present a good humidity barrier and, optionally, good oxygen barrier. Depending on the nature of the bulk material that is intended to be stored inside, these materials can also present UV rays- and light-barrier properties. In a special embodiment a part of the tank can be at least partially transparent by using for example a transparent plastic. Such a transparent part enables the control of the level of the remaining flowable product inside the container when this one is used.

The container also comprises a dispensing closure for either closing or opening the tank for dispensing the product from the tank. The dispensing closure is generally attached to an end of the tank. The dispensing closure comprises an outer fixed disc member having at least one aperture therein, said member facing the outside of the container and an inner rotatable disc member having at least one aperture therein, said member facing the inside of the container. Preferably the two disc members are placed sufficiently closed one from the other so that no powder can slide against them, yet without preventing the inside disc from sliding against the outside disc member during its rotation. Each of the disc members presents at least one aperture. The apertures in the discs are positioned in the disc members so that they can overlap when the inner disc member rotates. The apertures can be of any shape. Preferably the apertures present the same shape.

The inner disc member that is rotatable is placed inside the container compared to the other outer disc member. This inner rotatable disc member presents means configured for cooperating with a rotary shaft. This means is preferably placed at the centre of the inner disc member and can be a hole or a bump in the disc which shape can match with the shape of the extremity of the rotary shaft. The outer fixed disc member is placed outside the container compared to the other inner disc member. It usually presents a sufficiently large opening in its centre so that a rotary shaft can cooperate with the inner disc member without bumping on the outer fixed disc member. The inner rotatable disc member is able to rotate and to make a grand tour.

Generally when the container of the present invention is not used—in particular not used for dispensing—the at least one aperture in the inner rotatable disc member and the at least one aperture in the outer fixed disc member do not overlap. Actually the container is preferably conceived so that the apertures of the disc members do not overlap, when the container is not used for dispensing the flowable product, in particular when it is separated from the machine. This feature is obtained by setting the position of the inner disc member relative to the outer disc member. Usually the relative position of the disc members is fixed during the manufacture of the container so that the apertures do not overlap.

The container of the present invention presents at least one means for positioning the container in a machine to be fed with the flowable product. The at last one means for positioning the container in a machine is generally configured for orienting the at least one aperture in the inner rotatable disc member. Then this means particularly helps for positioning the metering and dispensing closure of the container relative to the machine, and consequently all the apertures of the disc members relative to the machine. According to a preferred embodiment this at least one means for positioning the container in a machine can also be configured for fixing the container to a machine. At least one of the means for positioning the container in a machine can comprise a socket in the centre of the inner rotatable disc member, said socket being configured for cooperating with a rotatable shaft of a machine. The socket preferably presents an asymmetric shape. This asymmetric shape helps the user for positioning the container in a machine. The end of the shaft in the machine can present a shape corresponding to that socket so that the container can be placed in a machine according to a specific orientation. At least one of the means for positioning the container in a machine can also comprise cam(s) or cam track(s) in a fixed part of the container like the tank or the outer fixed disc member of the dispensing closure. The cam(s) or cam track(s) can respectively fit in corresponding cam track(s) or cam(s) of a machine. This at least one means for positioning the container in a machine can also comprise a visual indicator on the surface of the container. The visual indicator—e.g. an arrow—indicates to the user how to position the container in a machine.

The container can comprise means for scraping the upper side of the inner rotatable disc member. The scraping function is implemented when the rotatable disc member rotates. The scraping means can be a rod extending from the centre of the container to the lateral side of the container. Generally the scraping means is fixed.

Preferably the container of the present invention is disposable.

Preferably the tank and the dispensing closure are not detachable one from the other without destroying a part of the container. Then the container cannot be refilled with a flowable product that is not adapted for being dispensed in the machine cooperating with the container. The container is not openable manually. The container is not refillable manually.

According to a preferred embodiment the container stores a food ingredient powder, preferably a soluble beverage ingredient like coffee, chocolate, tea, milk, soup or a coffee mix.

According to a second aspect the invention concerns a machine configured for receiving a container such as described above, said machine comprising a dosing and docking unit, said unit comprising:

an outer fixed disc member having at least one aperture therein, said outer fixed disc member facing the outside of the machine, an inner rotatable disc member having at least one aperture therein, said inner rotatable disc member being mounted on the bottom side of the outer fixed disc member a rotary shaft for rotating the machine inner rotatable disc member, at least one means for positioning the container relative to the dosing and docking unit of the machine.

Preferably the dosing and docking unit comprises a receiving area for docking the container such as described hereabove.

Preferably the two disc members of the dosing and docking unit are placed sufficiently closed one to the other so that no powder can slide against them during the rotation, yet without preventing the inner rotatable disc member from sliding against the outer fixed disc member. Each of the disc members presents at least one aperture. The apertures are positioned in the disc members so that they can overlap when the inner rotatable disc member rotates. The apertures can be of any shape. Preferably the both apertures present the same shape. Preferably the outer fixed disc member is sufficiently thick so that its aperture creates a volume corresponding to the metered amount of the flowable product to be dosed. The outer fixed disc member is provided with an axial bearing passage for receiving and rotatably supporting the shaft of the machine. Yet it cannot be engaged by the shaft. The inner rotatable disc member is connected to the rotary shaft so that it is rotatable relative to the outer fixed disc member. It is able to rotate and to make a grand tour during a dosing operation delivering one metered dose.

Preferably when the machine is at rest—that is when no dispensing occurs—the at least one aperture in the outer fixed disc member and the at least one aperture in the inner rotatable disc member do not overlap.

The dosing and docking unit comprises at least one means for positioning the container relative to the dosing and docking unit of the machine. This means preferably cooperates with corresponding positioning means of the container. Said means of the machine and of the container are conceived so that when the container is docked in the machine, the aperture of the outer fixed disc member of the container faces the aperture of the outer fixed disc member of the dosing and docking unit. At least one of the means for positioning the container can comprise an engaging surface at the end of the rotary shaft, said engaging surface being configured for cooperating with a corresponding part of the container. The engaging surface preferably presents an asymmetric shape. This asymmetric shape helps the user for orienting the container in the machine. At least one of the means for positioning the container in a machine can also comprise cam(s) or cam track(s) in a fixed part of the docking and dosing unit like its outer fixed disc member. The cam(s) or cam track(s) can respectively fit in corresponding cam track(s) or cam(s) of the container. Preferably the at least one positioning means can also be configured for attaching the container to the machine. This at least one means for positioning the container relative to the dosing and docking unit of the machine can also comprise a visual indicator on the surface of the machine. The visual indicator—e.g. an arrow—indicates to the user how to position the container in the machine.

According to a specific embodiment the fixed disc member of the dosing and docking unit presents a slit linking the edge of said disc to a cavity inside the outer fixed disc member emerging on the aperture of the inner rotatable disc member in the stand-by position of the machine. This slit is useful for providing an air current inside the aperture of the disc member in particular when hygroscopic powders are delivered. For example, when the machine is used for delivering a beverage powder in a chamber or a container where it is mixed with a fluid, moisture can settle in the discharging aperture of the inner rotatable disc member. The provision of an air current enables the drying of the aperture before it is used again for discharging a new dose of powder.

According to the preferred embodiment the machine is configured for preparing a beverage from a flowable beverage concentrate and it comprises a mixing chamber connected to at least one diluent supply means the bottom side of the dosing and docking unit cooperating with said mixing chamber. The bottom side of the dosing and docking unit cooperates with the mixing chamber so that a dose of flowable product flowing through the aperture of the inner rotatable disc member flows in the mixing chamber. The mixing chamber can be either fixed and permanently placed under said aperture or it can be movable so as to be placed only momentarily under the aperture of the inner rotatable disc member such as described in WO 2009/153157.

According to a third aspect the invention concerns a system for preparing beverages by mixing a flowable beverage concentrate with a diluent comprising:
a container such as described above for storing the flowable beverage concentrate,
a machine such as described above,
wherein:
the machine rotary shaft is able to engage and rotate the container inner rotatable disc member when the container is docked in the machine, and
the at least one means of the container for positioning the container in the machine and the at least one means of the machine for positioning the container relative to the dosing and docking unit of the machine position the metering and dispensing closure of the container relative to the dosing and docking unit of the machine, so that the aperture of the container outer fixed disc member overlaps the aperture of the machine outer fixed disc member,
when the container is docked in the machine, the apertures are disposed one relative to the others so that in the stand-by position:
the aperture of the container inner rotatable disc member is disposed before the apertures of the container outer fixed disc member and the machine outer fixed disc member according to the rotation sense of the rotatable disc members, and
the aperture of the machine inner rotatable disc member is disposed after the apertures of the container outer fixed disc member and the machine outer fixed disc member according to the rotation sense of the rotatable disc members.

Yet the aperture of the machine rotatable disc member is disposed before aperture of the container rotatable disc member according to the rotation sense.

According to the preferred embodiment, when the container is docked in the machine, the apertures are disposed one relative to the others so that in the stand-by position:
the aperture of the container inner rotatable disc member is disposed 90° before the apertures of the container outer fixed disc member and the machine outer fixed disc member according to the rotation sense of the rotatable disc members, and
the aperture of the machine inner rotatable disc member is disposed 180° after the apertures of the container outer fixed disc member and the machine outer fixed disc member according to the rotation sense of the rotatable disc members.

According to the preferred embodiment:
the container presents a dispensing closure comprising an inner rotatable disc member having one aperture therein and an outer fixed disc member having one aperture therein, and
the docking and dosing unit presents an outer fixed disc member having one aperture and an inner rotatable disc member having one aperture Generally a dosing operation requires at least one complete rotation of the both rotatable disc members. Several complete rotations can be implemented depending of the desired number of doses.

In the present application, the terms "front", "back", "top" and "bottom" are used to describe the relational positioning of features of the invention. These terms should be understood to refer to the container in its normal orientation when docked in the machine.

As used in reference to the inner and outer disc members, the terms inner and outer are used to mean that the inner disc member is longitudinally nearer the interior space of the container than the outer disc member.

BRIEF DESCRIPTION OF THE DRAWINGS

The characteristics and advantages of the invention will be better understood in relation to.

DETAILED DESCRIPTION OF THE DRAWINGS

Figure 1:
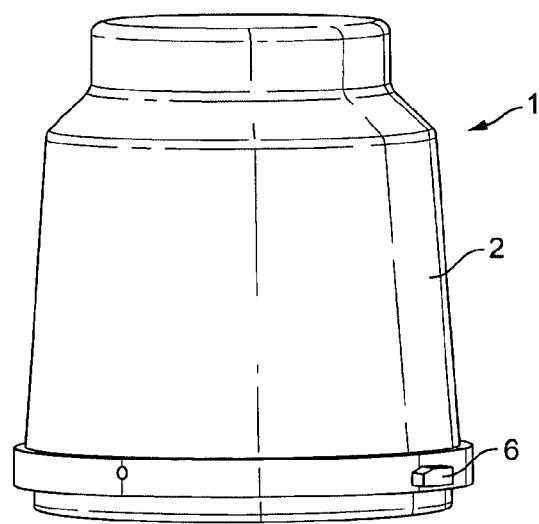
FIG. 1 depicts a perspective view of a container of the present invention.
Figure 2:
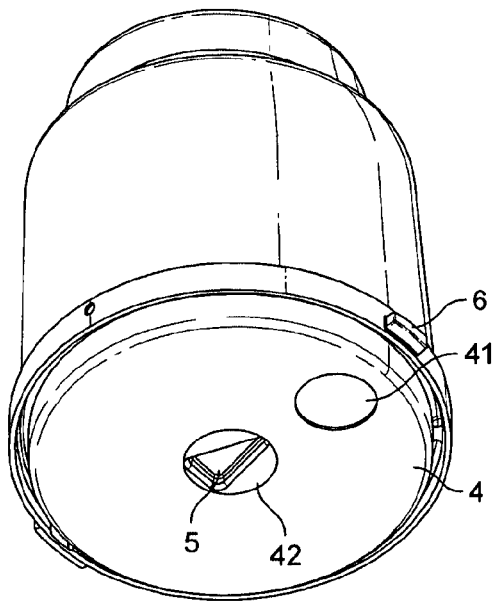
FIG. 2 depicts a view of a container of the present invention from the bottom.
Figure 3:
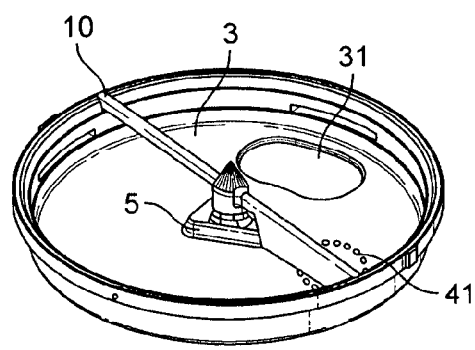
FIG. 3 depicts the dispensing closure of a container of the present invention.
Figure 7:
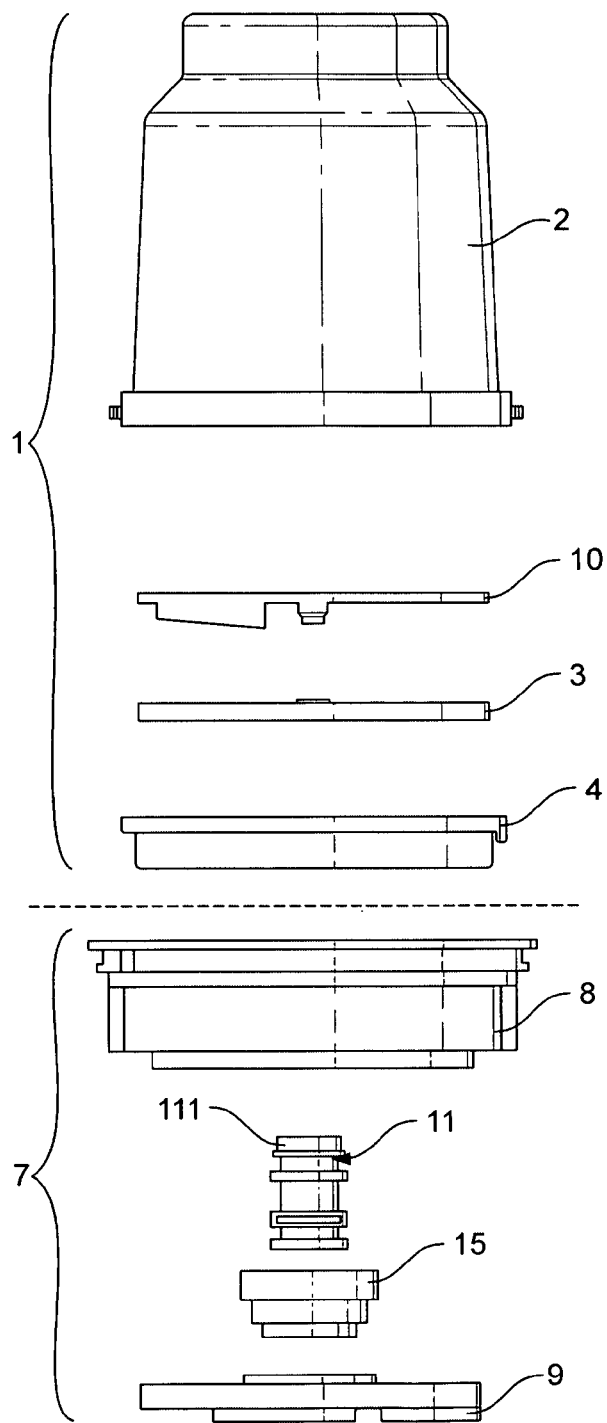
FIG. 7 is an exploded view of a system of a container and a dosing and docking unit according to the present invention.

FIGS. 1, 2 and 3 illustrate a container 1 according to the present invention. The container comprises a tank 2 for storing a powder. The tank is closed by a dispensing closure placed on the bottom of the tank 2. This dispensing closure comprises an outer fixed disc member 4 having at least one aperture 41 therein for dispensing the powder. This outer fixed disc member 4 faces the outside of the container. The dispensing closure also comprises an inner rotatable disc member 3 having at least one aperture 31 for dispensing the powder; this member faces the inside of the container 1. The inner rotatable disc member 3 presents means for cooperating with a rotatable shaft; in the present figures this means is a slot 5 inside the under the side of the inner rotatable disc member 3. This slot 5 can be engaged by a shaft end presenting a corresponding shape. This slot presents an asymmetric shape—here a triangle shape—so as to position the container relative to the machine when it engages the shaft end presenting a corresponding end (as illustrated in FIG. 7). The outer fixed disc member 4 also presents an aperture 42 at its centre enabling a rotatable shaft to go through it and cooperate with the inner rotatable disc member 3 without touching the outer member disc. For each disc 3, 4, the aperture 31, 41 is off centre. The two apertures are positioned in each disc so that they are able to overlap each other when the inner rotatable disc member 3 rotates. The container 1 can present other means for positioning the container in a machine, and consequently for positioning the metering and dispensing closure relative to the machine. This other means can be cams 6 cooperating with cam tracks in the machine. The means for positioning the container in the machine are particularly important when the container 1 presents a circular section base: without the positioning means the container could be placed according to any angular orientation in the machine without guarantee that the aperture of the container in particular aperture 41 can correspond to an aperture in the machine.

During manufacture the disc members 3, 4 are positioned one relative to the other so that their apertures 31, 41 do not overlap when the container is not used for dispensing the flowable product, in particular when the container is separated from the machine. The container is designed so that no powder can fall out of the container when it is separated from the machine.

The container also comprises means for scraping the upper side of the inner rotatable disc member when said member rotates. In the particular illustrated embodiment the scraping means is a rod 10 extending from the centre of the container to its lateral side. It is fixed due to its positioning in notches in upward lateral walls of the fixed disc member 4. When some powder remains in the container the scraping means can help scrape away the remaining powder from the container and push the scraped powder in the aperture 41. Preferably it is positioned just after the aperture 41 of the outer fixed disc member 4 according to the sense of rotation of the rotatable disc member 3 (as illustrated in dotted line in FIG. 3).

During manufacture, for filling the container with a powder, the tank 2 is first filled with the powder and then the dispensing closure made of the two disc members and the scraper means are used to close the tank. The tank and the dispensing closure can be attached together by any known means like snap-fitting or welding. Preferably they cannot be detached one from the other without destroying a part of the container to avoid refilling of the container with a flowable product that is not adapted for delivering to the machine. Besides the dispensing closure is configured so that it is difficult or even not possible to manually rotate the inner rotatable disc member to get an overlap of the discs apertures 31, 41.

Figure 4:
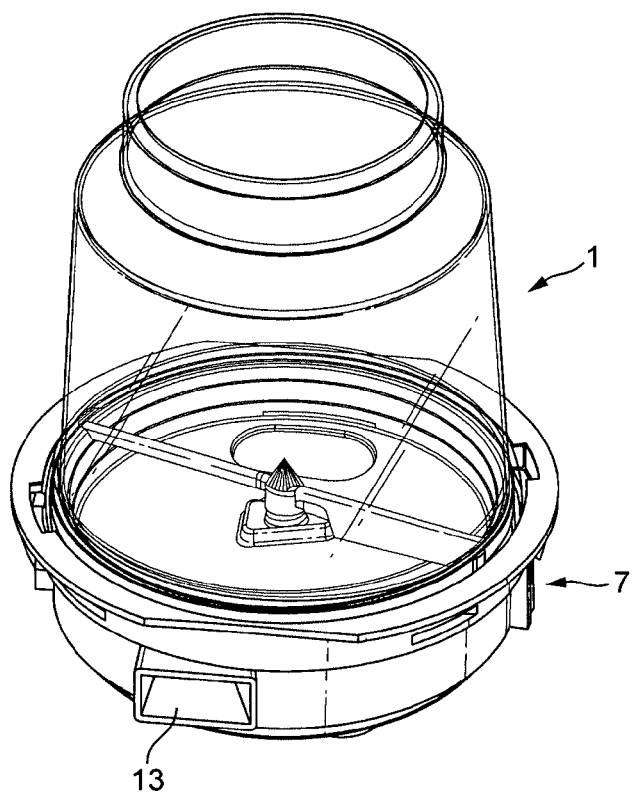
FIG. 4 depicts the container of the present invention attached and positioned in a dosing and docking unit of a machine according to the present invention (machine not illustrated).
Figure 9:
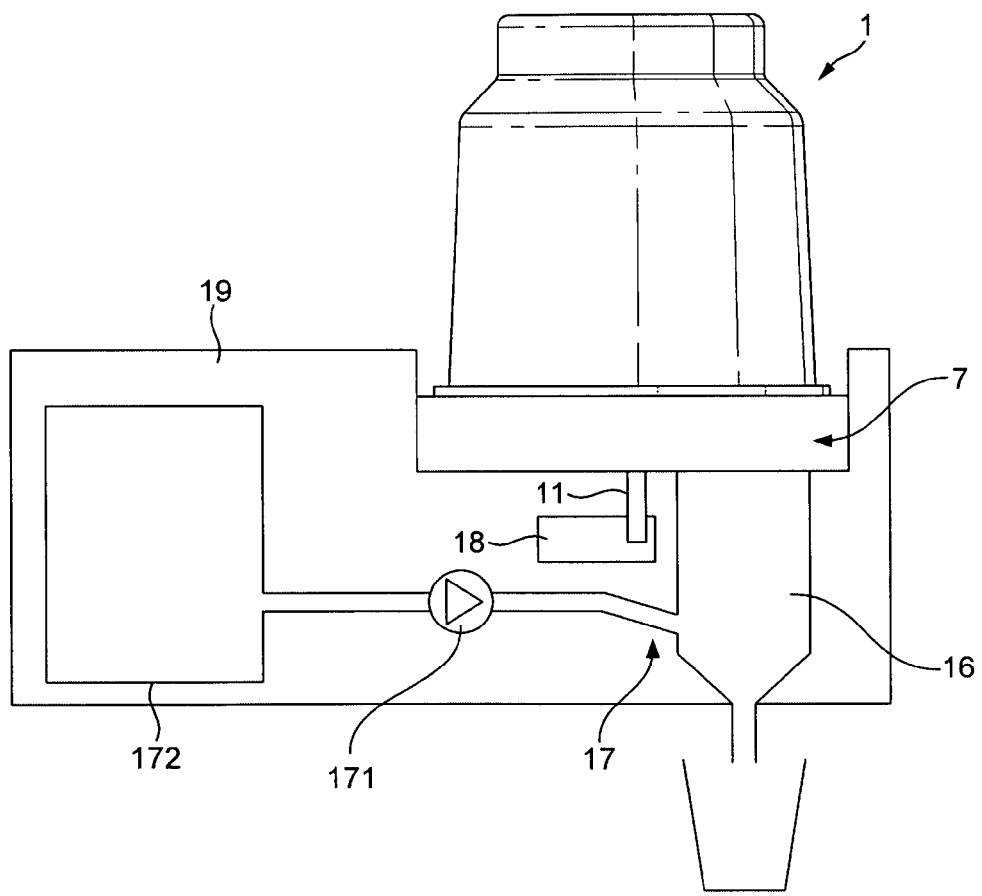
FIG. 9 is a schematic illustration of a machine according to the invention.

FIG. 4 depicts the container 1 of the present invention attached and positioned in a dosing and docking unit 7 of a machine. FIG. 9 is as schematic view of a machine according to the invention in which a container 1 is docked on the docking and dosing unit 7. The aperture in the inner disc member of the docking and dosing unit emerges on a mixing chamber 16 which is a supplied with a diluent by a diluent supply means 17, usually a pipe emerging in the mixing chamber. The diluent supply means is connected to a pump 171 and a diluent tank 172. The machine also comprises a motor 18 connected to the shaft 11 for rotating the dosing unit 7. The different elements of the machine are hired in a frame 19. The outlet of the mixing chamber evacuates the beverage produced from the machine in a cup 20.

Figure 5:
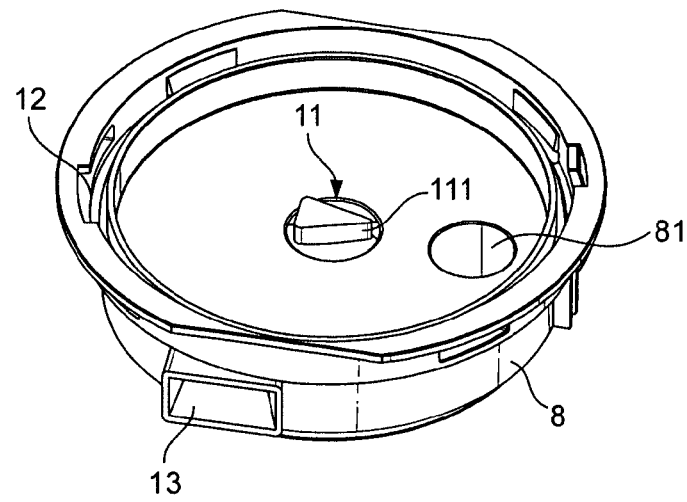
FIG. 5 is an upper view of the dosing and docking unit present in FIG. 4
Figure 6:
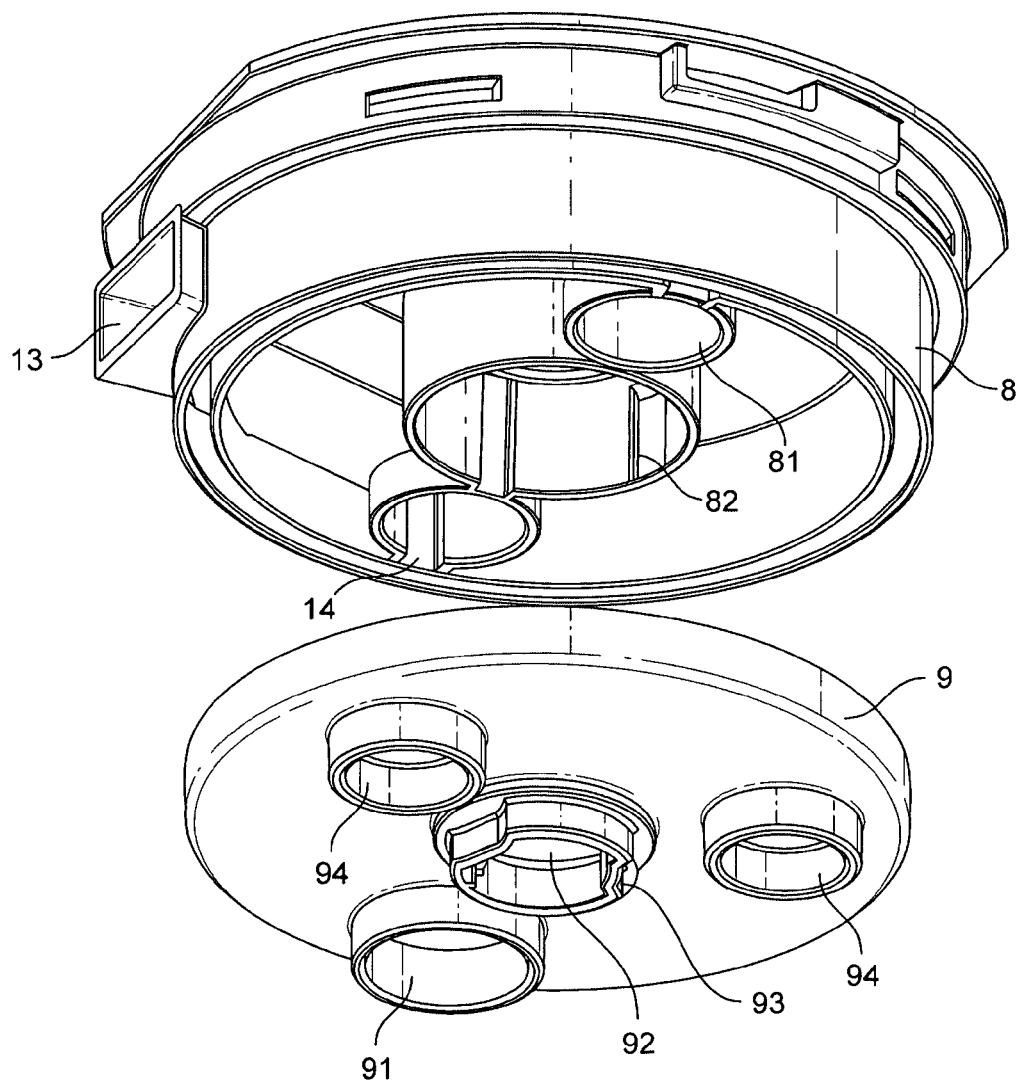
FIG. 6 is an exploded view of the outer fixed disc member and the inner rotatable bottom disc member in the dosing and docking unit of FIG. 4.

FIGS. 5, 6 detail the dosing and docking unit 7 of the machine. The dosing and docking unit 7 comprises an outer fixed disc member 8 having at least one aperture 81 therein said fixed disc member facing the outside of the machine. Preferably the outer fixed disc member 8 is sufficiently thick so that its aperture 81 creates a volume corresponding to the metered amount of the powdered product to be dosed. The dosing and docking unit 7 also comprises an inner rotatable disc member 9 having at least one aperture 91 therein, said rotatable disc member being mounted on the bottom side of the fixed disc member 8. For each disc 8, 9, the aperture 81, 91 is off centre. The two apertures are positioned in each disc so that they are able to overlap each other when the inner rotatable disc member 9 rotates. The dosing and docking unit 7 also comprises a rotary shaft 11 for rotating the machine rotatable disc member 9. The outer fixed disc member 8 presents a central aperture 82 for introducing and supporting said rotary shaft 11 without being driven by the shaft. The inner rotatable disc member 9 presents a central aperture 92 for introducing said rotary shaft 11 and cooperating with it and being rotated. The shaft 11 is conceived so as to engage the inner rotatable disc member 9 and leave the outer disc member 8 immobile. It can engage the inner rotatable disc member 9 by the means of blades (not illustrated) which can slide inside corresponding slots 93 in the disc 9. The orientation of the means for connecting the shaft with the inner rotatable disc member 9 is defined so as to set the relative positions of this disc with the outer fixed disc member 8 when the different elements of the dosing and docking unit 7 are assembled. The assembly of the container and the dosing and docking unit are supported by a frame of the machine. The dosing and docking unit is connected to a motor machine through the shaft 11.

The outer fixed disc member 8 can be empty or full. It can present a slit 13 inside its edge linked to a cavity 14 emerging on the aperture 91 of the inner rotatable disc member 9 in the stand-by position of the dosing and docking unit 7. This slit 13 can be connected to a fan so as to provide a current of air for drying the aperture 91 when it moves in the stand-by position.

Optionally protuberances 94 on the bottom side of the inner rotatable disc member 9 can be present to enter in corresponding embossments in a rotatable plate of the machine to help in the driving of the inner rotatable disc member 9.

The dosing and docking unit 7 comprises means 12 for positioning the container 1 to the machine and optionally for attaching it. One part of these means are cam tracks 12 cooperating with the cams 6 of the container 1. The cams and cam tracks 6, 12 are positioned so as to set the positioning of the container relative to the dosing and docking unit 7 and in particular the relative positions of the apertures 31, 41, 81 and 91 one to the others. Another part of these means is the engaging surface 111 at the end of the rotary shaft 11 which presents a triangular shape for engaging the corresponding triangular shape slot 5 of the container 1 illustrated in FIG. 2.

Preferably in the stand-by position, the discs 3, 4, 8 and 9 are positioned one relative to the other so that:

the apertures 41, 81 of the outer fixed disc members 4, 8 overlap each others, none of the apertures 31, 91 of the inner rotatable disc members 3, 9 overlap the other apertures, these apertures 31, 91 of the inner rotatable disc members 3, 9 are positioned so that in the sense of rotation of the container and machine rotatable disc members 3, 9 the taking out aperture 31 overlaps the apertures 41, 81 of the fixed disc members 4, 8 before the discharging aperture 91. For example, the taking out aperture 31 of the container member disc 3 is placed 90° before the apertures 41, 81 and the discharging aperture 91 is placed 180° before the apertures 41, 81.

FIG. 7 is an exploded view of a system of a container 1 and a dosing and docking unit 7 according to the present invention. Piece 15 enables connection of the rotatable disc 9 with the shaft 11.

Figure 8:
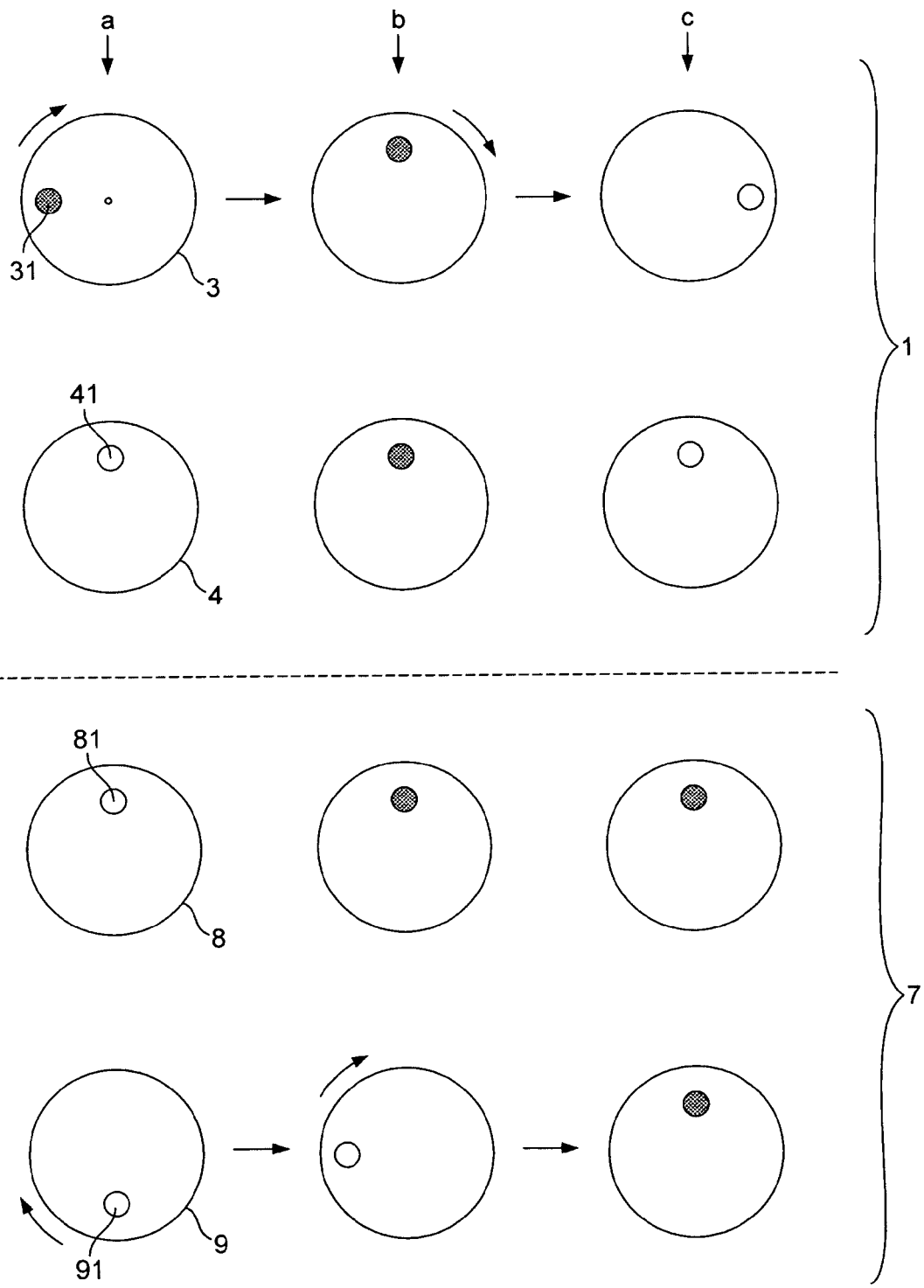
FIG. 8 is a schematic illustration of the relative positions of the apertures of the different disc members during the dosing operation viewed from the top.

FIG. 8 schematically illustrates the relative positions of the apertures 31, 41, 81, 91 of the outer fixed disc members 4, 8 and the inner rotatable disc members 3, 4 during the dosing operation viewed from the top. For a clockwise sense of rotation the first column a of FIG. 8 corresponds to the stand-by position of the system: in the container 1, the taking out aperture 31 of the inner rotatable disc member 3 is in contact with the powder stored in the tank but it does not face the apertures 41, 81 of the outer fixed disc members 4, 8. The discharged aperture 91 of the bottom rotatable disc member 9 of the docking unit 7 is offset from the apertures 41, 81 of the outer fixed disc members 4, 8 so that these ones are closed to the atmosphere.

When the dosing unit 7 is activated the inner rotatable disc members 3, 4 of the container 1 and the docking and dosing unit are moved together through clockwise movement of the shaft whereas the central disc members 4, 8 are fixed. Consequently the apertures 41, 81 of the outer fixed disc members remain in place while the taking out aperture 31 and the discharging aperture 91 rotate.

Column b shows the moment in the dosing operation where the taking out aperture 31 moves above the apertures 31, 81 enabling powder to fall inside the metered aperture 81. The surface of the taking out aperture 31 can be larger than the surface of the metered aperture 81 so that during the rotation movement, the time for letting powder falls inside the metered aperture 81 is sufficiently long. Then the back edge of the taking out aperture 31 can scrape the surface of the powder inside the metered aperture 81. Simultaneously the discharging aperture 91 of the inner rotatable disc member has moved but it is still offset from the aperture 81 so that there is no contact of the atmosphere with the powder metered or stored above.

Column c shows the moment in the dosing operation where the discharging aperture 91 moves under the aperture 81 enabling powder to be discharged from the metered aperture 81. Simultaneously the taking out aperture 31 of the container rotatable disc member has moved but it is offset from the apertures 41, 81 so that there is no contact of the atmosphere with the powder stored in the container. Then the rotatable disc members continue to rotate until they have turned 360° coming back to the stand-by position of column a. In this stand-by position, the apertures 41, 81 do not comprise any powder since they have not been covered by the taking out aperture 31 and since they have just been emptied. Then it is closed to the atmosphere.

The method for metering one dose of powder implies the complete rotation of the rotatable disc members until they have reached their initial position. Several complete rotations may enable the dosing of several doses. This complete movement enables the stirring of the powder in the container which avoids the formation of form loose and/or hard clumps, cliff building, bridges, or triangular or pyramidal piles within the tank which have a significant influence on the powder supply and dosing operation of the machine. Such a problem occurs even more frequently in regions with high humidity since moisture supports the agglomeration of the powder. According to the present invention, powder can freely flow into the dosing unit.

The container can be easily detached from the dosing unit even if it is not empty without powder falling out of the container since in the stand-by position the container is closed to the atmosphere. The user just has to turn slightly the container to remove the cams 6 of the container from the cam tracks of the docking unit. Then he can place another container containing another type of flowable product in the dosing and docking unit.

The system of the present invention also presents the advantage of maintaining the freshness of the flowable product by limiting the contact of said product with air which can be of paramount importance for certain products like soluble coffee. The system actually avoids the usual complete transfer of the flowable product from a container into a tank of the machine which often leads to the introduction of air in the flowable product. Moreover, due to the fact that the container presents a small aperture for letting the powder flow from the container to the machine the contact with air is even more limited.

Besides in the system of the present invention, no flowable product can stay in the metering aperture of the outer fixed disc member of the dosing unit between two dosing operations. This aperture is always emptied after dosing. Consequently there is no risk that the flowable product may stay in this aperture and be degraded between two operations.

Moreover the system of the present invention presents the advantage of maintaining the freshness of the flowable product stored in the container by limiting the contact of said product with the diluent vapours which may rise up from the mixing chamber positioned under the docking and dosing unit. Due to the fact that there exists a stand-by position— illustrated by a) in FIG. 8—wherein the apertures in the both outer fixed disc members are both closed above by the inner rotatable disc of the container and below by the inner rotatable disc member of the dosing and docking unit, it is possible to introduce a diluent in a mixing chamber positioned below without risk to have the vapour entering in the container.

1 container
2 tank
3 container rotatable disc member
4 container fixed disc member
5 means to cooperate with the rotatable shaft 6 cam
7 dosing and docking unit
8 machine fixed disc member
9 machine rotatable disc member
10 scraping means
11 rotary shaft
12 cam track
13 slit
14 cavity
15 connecting piece
16 mixing chamber
17 diluent supply
171 pump
172 boiler
18 motor
19 frame
20 cup
31, 41, 42, 81, 82, 91, 92 apertures
111 engaging surface
93 slot
94 protuberance

The invention claimed is:

1. A container for storing and dispensing a flowable product, the container comprising:
   a tank;
   a dispensing closure configured to dispense the flowable product from the tank, the dispensing closure comprising
      an inner rotatable disc member (i) having at least one first aperture therein, (ii) facing an inside of the container, and (iii) comprising a member configured to cooperate with a rotatable shaft,
      an outer fixed disc member having at least one second aperture therein, the outer fixed disc member facing an outside of the container; and
   a positioning member configured to position the container in a machine, the positioning member configured to orient the at least one first aperture of the inner rotatable disc member and the at least one second aperture of the outer fixed disc member relative to the machine,
   the container is configured to be positioned in a receiving area of a dosing and docking unit of the machine, and the machine is designed to be fed by the flowable product.

2. The container according to claim 1, comprising a scraper configured to scrape an upper side of the inner rotatable disc member.

3. A container for storing and dispensing a flowable product, the container comprising:
   a tank;
   a dispensing closure configured to dispense the flowable product from the tank, the dispensing closure comprising
      an inner rotatable disc member (i) having at least one first aperture therein, (ii) facing an inside of the container, and (iii) comprising a member configured to cooperate with a rotatable shaft,
      an outer fixed disc member having at least one second aperture therein, the outer fixed disc member facing an outside of the container;
   a positioning member configured to position the container in a machine; and
   a scraper configured to scrape an upper side of the inner rotatable disc member, the scraper comprises a rod extending from a center of the container to a lateral side of the container.

4. The container according to claim 2, wherein the scraper is fixed to the closure.

5. The container according to claim 1, wherein the container is disposable.

6. The container according to claim 1, wherein the container stores a food ingredient powder.

7. A container for storing and dispensing a flowable product, the container comprising:
   a tank;
   a dispensing closure configured to dispense the flowable product from the tank, the dispensing closure comprising
      an inner rotatable disc member (i) having at least one first aperture therein, (ii) facing an inside of the container, and (iii) comprising a member configured to cooperate with a rotatable shaft,
      an outer fixed disc member having at least one second aperture therein, the outer fixed disc member facing an outside of the container; and
   a positioning member configured to position the container in a machine,
   the tank and the dispensing closure are not detachable one from the other without destroying at least a portion of the container.

8. The container according to claim 1, wherein when the container is not used, the at least one first aperture in the inner rotatable disc member and the at least one second aperture in the outer fixed disc member do not overlap.

9. A container for storing and dispensing a flowable product, the container comprising:
   a tank;
   a dispensing closure configured to dispense the flowable product from the tank, the dispensing closure comprising
      an inner rotatable disc member (i) having at least one first aperture therein, (ii) facing an inside of the container, and (iii) comprising a member configured to cooperate with a rotatable shaft,
      an outer fixed disc member having at least one second aperture therein, the outer fixed disc member facing an outside of the container; and
   a positioning member configured to position the container in a machine, the positioning member is configured to orient the at least one first aperture in the inner rotatable disc member in relation to a machine.

10. The container according to claim 1, wherein the positioning member comprises a socket in a center of the inner rotatable disc member susceptible to cooperate with a rotatable shaft of a machine.

11. The container according to claim 9, wherein the positioning member comprises a visual indicator on a surface of the container.

12. The container according to the claim 9, wherein the positioning member comprises a cam or cam track in a fixed part of the container.

13. A machine configured to receive a container for storing and dispensing a flowable product, the container comprising a tank; a dispensing closure configured to dispense the flowable product from the tank, the dispensing closure comprising an inner rotatable disc member (i) having at least one first aperture therein, (ii) facing an inside of the container, and (iii) comprising a member configured to cooperate with a rotatable shaft an outer fixed disc member having at least one second aperture therein, the outer fixed disc member facing an outside of the container; and a positioning member configured to position the container in a machine, the machine configured to prepare a beverage from the flowable product, the machine comprising:
- a dosing and docking unit comprising:
  - an outer fixed disc member having at least one third aperture therein, the outer fixed disc member facing an outside of the machine,
  - an inner rotatable disc member having at least one fourth aperture therein, the inner rotatable disc member mounted on a bottom side of the outer fixed disc member,
  - a rotary shaft configured to rotate the inner rotatable disc member of the machine;
- a mixing chamber connected to at least one diluent supply and cooperating with a bottom side of the dosing and docking unit; and
- at least one member configured to position the container relative to the dosing and docking unit of the machine.

14. The machine according to claim 13, wherein the outer fixed disc member comprises a slit linking an edge of a disc to a cavity inside the outer fixed disc member emerging on the at least one second aperture of the inner rotatable disc member in a stand-by position of the machine.

15. The machine according to claim 13, wherein when the machine is at rest, the at least one first aperture in the outer fixed disc member and the at least one second aperture in the inner rotatable disc member do not overlap.

16. A system for preparing beverages by mixing a flowable beverage concentrate with a diluent, the system comprising:
- a container configured to store and dispense a flowable product, the container comprising
  - a tank,
  - a dispensing closure configured to dispense the flowable product from the tank, the dispensing closure comprising an inner rotatable disc member having at least one first aperture therein, the member inner rotatable disc facing an inside of the container, an outer fixed disc member having at least one second aperture therein, the outer fixed disc member facing an outside of the container, the inner rotatable disc member comprising a member configured to cooperate with a rotatable shaft, and
  - a positioning member configured to position the container in a machine; and
- the machine comprising
  - a machine rotary shaft that is able to engage and rotate the inner rotatable disc member when the container is docked in the machine, and
  - at least one member configured to position the container in the machine relative to a dosing and docking unit of the machine, the at least one member positioning a metering and dispensing closure of the container relative to the dosing and docking unit of the machine, so that the at least one second aperture of the outer fixed disc member of the container overlaps at least one third aperture of an outer fixed disc member of the machine, when the container is docked in the machine, the at least one first, second, and third apertures are located one relative to the others so that in a stand-by position,
- the at least one first aperture of the inner rotatable disc member of the container is located before the at least one second aperture of the outer fixed disc member of the container and the at least one third aperture of the outer fixed disc member of the machine, and
- at least one fourth aperture of an inner rotatable disc member of the machine is located after the at least one second aperture of the outer fixed disc member of the container and the at least one third aperture of the outer fixed disc member of the machine according to a rotation sense of the inner rotatable disc members of the container and the machine.

17. The system according to claim 16, wherein when the container is docked in the machine, the at least one first, second, third, and fourth apertures are located one relative to the others so that in the stand-by position,
- the at least one first aperture of the inner rotatable disc member of the container is located 90° before the at least one second aperture of the outer fixed disc member of the container and the at least one third aperture of the outer fixed disc member of the machine, and
- the at least one fourth aperture of the inner rotatable disc member of the machine is located 180° before the at least one second of the outer fixed disc member of the container and the at least one third the outer fixed disc member of the machine according to the rotation sense of the inner rotatable disc members of the container and the machine.

18. The system according to claim 16, wherein the container comprises a dispensing closure comprising a rotatable disc member having one aperture therein and a fixed disc member having one aperture therein, and
- the dosing and docking unit comprises a fixed disc member having one aperture and a rotatable disc member having one aperture, and
- a dosing operation requires at least one complete rotation of the rotatable disc members of the dispensing closure and the dosing and docking unit.

* * * * *